US008874698B2

(12) United States Patent
Abbott et al.

(10) Patent No.: US 8,874,698 B2
(45) Date of Patent: Oct. 28, 2014

(54) SYSTEMS AND METHODS FOR SELECTING ADVERTISEMENTS FOR DISPLAY OVER A COMMUNICATIONS NETWORK

(71) Applicant: Advertising.com LLC, Dulles, VA (US)

(72) Inventors: Martin Abbott, Fountain Hills, AZ (US); Michael Fisher, Mount Kisko, NY (US); Michael Yavonditte, Garrison, NY (US); Yaron Galai, New York, NY (US)

(73) Assignee: Advertising.com LLC, Dulles, VA (US)

( * ) Notice: Subject to any disclaimer, the term of this patent is extended or adjusted under 35 U.S.C. 154(b) by 0 days.

(21) Appl. No.: 13/846,573

(22) Filed: Mar. 18, 2013

(65) Prior Publication Data

US 2013/0218665 A1 Aug. 22, 2013

(51) Int. Cl.
*G06F 15/16* (2006.01)
*G06Q 30/02* (2012.01)
*G06Q 30/08* (2012.01)

(52) U.S. Cl.
CPC ............ *G06Q 30/0244* (2013.01); *G06Q 30/02* (2013.01); *G06Q 30/08* (2013.01)
USPC ........................................................ 709/219

(58) Field of Classification Search
None
See application file for complete search history.

(56) References Cited

U.S. PATENT DOCUMENTS

| | | |
|---|---|---|
| 5,636,346 A | 6/1997 | Saxe |
| 5,724,521 A | 3/1998 | Dedrick |
| 5,848,396 A | 12/1998 | Gerace |
| 5,918,014 A | 6/1999 | Robinson |
| 5,930,762 A | 7/1999 | Masch |
| 5,948,061 A | 9/1999 | Merriman et al. |
| 6,006,197 A | 12/1999 | D'Eon et al. |
| 6,009,410 A | 12/1999 | LeMole et al. |
| 6,012,051 A | 1/2000 | Sammon et al. |
| 6,078,866 A | 6/2000 | Buck et al. |
| 6,085,229 A | 7/2000 | New man et al. |
| 6,098,082 A * | 8/2000 | Gibbon et al. ................ 715/202 |
| 6,119,098 A | 9/2000 | Guyot et al. |
| 6,161,127 A | 12/2000 | Cezar et al. |
| 6,161,142 A | 12/2000 | Wolfe et al. |
| 6,216,129 B1 | 4/2001 | Eldering |
| 6,236,975 B1 | 5/2001 | Boe et al. |
| 6,269,361 B1 | 7/2001 | Davis et al. |
| 6,285,985 B1 | 9/2001 | Horstmann |
| 6,285,987 B1 | 9/2001 | Roth et al. |
| 6,314,451 B1 | 11/2001 | Landsman et al. |
| 6,317,761 B1 | 11/2001 | Landsman et al. |

(Continued)

FOREIGN PATENT DOCUMENTS

| | | |
|---|---|---|
| JP | 2000-163477 | 6/2000 |
| WO | WO 98/58334 | 12/1998 |

OTHER PUBLICATIONS

Davis, Harold, "Google Advertising Tools", Jan. 1, 2006, O'Reilly, XP007904687.

(Continued)

*Primary Examiner* — Brian P Whipple
(74) *Attorney, Agent, or Firm* — Finnegan, Henderson, Farabow, Garrett & Dunner LLP (57) ABSTRACT

Systems and methods are provided for selecting advertisements for display over a communications network and, more particularly, to systems and methods for selecting video advertisements for display within internet web pages based on relevance, bid price, past performance, or a combination thereof.

23 Claims, 3 Drawing Sheets

(56) References Cited

U.S. PATENT DOCUMENTS

| | | |
|---|---|---|
| 6,317,782 B1 | 11/2001 | Himmel et al. |
| 6,353,849 B1 | 3/2002 | Linsk |
| 6,370,578 B2 | 4/2002 | Revashetti et al. |
| 6,442,529 B1 | 8/2002 | Krishan et al. |
| 6,453,347 B1 | 9/2002 | Revashetti et al. |
| 6,470,079 B1 | 10/2002 | Benson |
| 6,477,509 B1 | 11/2002 | Hammons et al. |
| 6,477,575 B1 | 11/2002 | Koeppel et al. |
| 6,546,386 B1 | 4/2003 | Black et al. |
| 6,560,578 B2 | 5/2003 | Eldering |
| 6,581,070 B1 * | 6/2003 | Gibbon et al. ................... 1/1 |
| 6,591,248 B1 | 7/2003 | Nakamura et al. |
| 6,647,257 B2 | 11/2003 | Owensby |
| 6,850,252 B1 | 2/2005 | Hoffberg |
| 6,907,566 B1 | 6/2005 | McElfresh et al. |
| 6,925,441 B1 | 8/2005 | Jones et al. |
| 6,950,804 B2 | 9/2005 | Strietzel |
| 7,010,497 B1 | 3/2006 | Nyhan et al. |
| 7,039,599 B2 | 5/2006 | Merriman et al. |
| 7,043,483 B2 | 5/2006 | Colace et al. |
| 7,076,495 B2 | 7/2006 | Dutta et al. |
| 7,107,264 B2 | 9/2006 | Lu |
| 7,373,599 B2 | 5/2008 | McElfresh et al. |
| 7,574,651 B2 | 8/2009 | Ebrahimi et al. |
| 7,657,561 B2 * | 2/2010 | Gibbon et al. ............... 715/202 |
| 7,747,619 B2 * | 6/2010 | Gorodyansky et al. ....... 707/732 |
| 7,856,658 B2 | 12/2010 | James |
| 2002/0072965 A1 | 6/2002 | Merriman et al. |
| 2002/0099834 A1 | 7/2002 | Sielaff et al. |
| 2003/0046348 A1 * | 3/2003 | Pinto et al. .................... 709/206 |
| 2003/0208626 A1 * | 11/2003 | Gibbon et al. ............... 709/247 |
| 2004/0138946 A1 | 7/2004 | Stolze |
| 2005/0234779 A1 | 10/2005 | Chiu et al. |
| 2006/0089880 A1 | 4/2006 | Merriman et al. |
| 2006/0212353 A1 | 9/2006 | Roslov et al. |
| 2006/0253328 A1 | 11/2006 | Kohli et al. |
| 2007/0180147 A1 | 8/2007 | Leigh |
| 2007/0250636 A1 | 10/2007 | Stephens |
| 2008/0021783 A1 * | 1/2008 | Varghese ........................ 705/14 |
| 2008/0097834 A1 * | 4/2008 | McElfresh et al. ............. 705/10 |
| 2008/0126515 A1 | 5/2008 | Chambers et al. |
| 2009/0106094 A1 * | 4/2009 | DeLine et al. .................. 705/14 |
| 2010/0091182 A1 * | 4/2010 | Gibbon et al. ................ 348/441 |

OTHER PUBLICATIONS

Beaulieu, Mark, "Wireless Internet Applications and Architecture", Dec. 17, 2001, Addison Wesley Professional XP007904688.

Tanenbaum, Andrew S., "Computer Networks, Fourth Edition", Aug. 9, 2002, Prentice Hall, XP007904689.

European Search Report for European Application No. 07255023.9, dated May 9, 2008.

Korean International Search Report and Written Opinion, dated Apr. 29, 2008, for PCT Application No. PCT/US2007/88819.

* cited by examiner

SYSTEMS AND METHODS FOR SELECTING ADVERTISEMENTS FOR DISPLAY OVER A COMMUNICATIONS NETWORK

CROSS REFERENCE TO RELATED APPLICATION(S)

This application is a continuation of and claims the benefit of priority to U.S. patent application Ser. No. 11/646,637, filed Dec. 28, 2006 (now allowed), the disclosure of which is incorporated herein by reference to its entirety.

FIELD OF THE INVENTION

The present invention relates generally to systems and methods for selecting advertisements for display over a communications network and, more particularly, to systems and methods for selecting video advertisements for display within internet web pages based on relevance, bid price, past performance, or combinations thereof.

BACKGROUND OF THE INVENTION

Advertisements such as banner ads are often displayed in a web page in response to, for example, a user typing the Universal Resource Locator ("URL") for that web page into a web browser or selecting a link for the web page from a list of search results. Typically, each advertisement is associated with a single advertiser and may include text and/or graphics and/or audio. Upon selection of an advertisement (e.g., left click with a mouse), the web browser can be redirected to a web page associated with the advertisement from which the user can, for example, receive additional information, place online orders, or complete other transactions.

Advertisements can be selected for presentation in a web page in a variety of ways. An advertiser may pay to have its advertisements displayed within a given web page. For example, a brokerage house, bank, or manufacturer of accounting software may contract with a web page provider to have an advertisement displayed within a web page related to stock markets and financial data. The idea according to this approach is that end-users are more likely to "click-through" or otherwise respond to advertisements that are closely related to the content of the web page. While common, this approach limits the audience who will see the advertisements to visitors of the given web page. If an advertisement is not effective on the particular web page, the advertiser's only recourse is to stop advertising on that page and find a new web page on which to advertise.

In another approach, advertisements are selected for display within a web page substantially in real time based on demographical information of the particular user who is accessing the web page. For example, each user may be required to complete a questionnaire, provided via the internet, as a prerequisite to receiving access to the web page. Alternatively, a profile may be created for a user based on the user's activities while on-line including, for example, an indication of the web pages visited, how frequently and for how long those web pages are visited, how often the user makes a purchase on-line, and any demographic information the user supplies in the course of visiting websites. Demographic information may also be collected and retained by providers of web pages through the use of "cookies". Web pages that place cookies to within the memory of the user's computer can recognize the user whenever the user accesses the web page and can be used to track, for example, how often the user accesses the web page. The idea according to this approach is that end-users are more likely to "click-through" or otherwise respond to advertisements that are closely related to the user's interests and characteristics. However, this approach for selecting and displaying advertisements is often perceived as intrusive of the user's privacy and may be ineffective when the web page provider has insufficient information regarding the user's demographics.

Internet search engines also exist that display advertisements within a list of search results based on the keywords entered by a user into a search field. Typically, advertisers bid on the keywords and the highest bidder for a particular keyword is awarded the top most position in a ranked list, the next highest bidder is assigned the second highest position in the list, and so on. However, these systems have various drawbacks, including that the system has no control over the selection and display of advertising once the user navigates away from the web page containing the search results.

In view of the foregoing, it would be advantageous to provide an improved system and method for selecting and displaying advertisements over the internet.

SUMMARY OF THE INVENTION

Embodiments of the present invention provide systems and methods for selecting advertisements ("ads") for display over a communications network, which may include selecting video ads for display over the internet based on relevance, bid price, past performance, or a combination thereof.

An aspect of the invention provides for the selection and display of ads over a communications network. The system may include a database of one or more ads (e.g., video ads) and an ad selection application. The ad selection application may be configured to receive a request for advertising from a user computer (e.g., personal computer, laptop computer, mobile phone, etc.), wherein the request is generated automatically by the user computer in accordance with instructions provided to the user computer by a content publisher upon the user computer accessing a page (e.g., world wide web page) provided by the content publisher. For example, the instructions may include markup code provided to the user computer in response to the user computer submitting to the content publisher a HyperText Transfer Protocol (HTTP) request for access to the page. In response to the request, the video ad selection application may select one or more of the ads for display within the page.

Another aspect provides that the request for advertising submitted by the user computer may include one or more advertisement selection criteria, which may be used by the ad selection application to select an advertisement. For example, the ad selection criteria may be the location, size, and/or format of an advertisement region within the page, an identifier of the content publisher of the page, an identifier of the page, end-user demographic data, end-user preferences, or a combination thereof.

In some embodiments, the ad selection application may be configured to select a sequence of ads for display within the page. The ads may be ordered at least partially randomly by the ad selection application or may be ordered according to any other suitable approach or combination of approaches. For example, in some embodiments, the ad selection application may be configured to order the sequence of ads at least partially according to maximum bid amounts by advertisers associated with the ads. The ad selection application may configured to order the sequence of ads at least partially according to actual amounts advertisers associated with the advertisements would pay based on maximum bid amounts submitted by the advertisers for the ad placement opportunity.

In still other embodiments, the ad selection application may be configured to order the sequence of ads at least partially according to past performance of the ads within the database or similar ads. The system may include a content parser configured to parse the content of the page in order to determine one or more relevancy scores corresponding to the relevancy of the page to one or more themes. In such embodiments, the ad selection application may be configured to order the sequence of advertisements at least partially according to the relevancy scores.

In another aspect of the present invention, a system and corresponding method are provided for responding to a request for access to a page. The system may include a content publisher configured to receive a request from a user computer for access to a page. In response to the request, the content publisher may transmit both content for the page and instructions to the user computer, where the instructions direct the user computer to automatically request advertising from an advertisement selection system. For example, the content for the page and the instructions may form at least part of an HTTP response.

BRIEF DESCRIPTION OF THE DRAWINGS

For a better understanding of the present invention, reference is made to the following description, taken in conjunction with the accompanying drawings, in which like reference characters refer to like parts throughout, and in which.

DETAILED DESCRIPTION OF THE INVENTION

Figure 1:
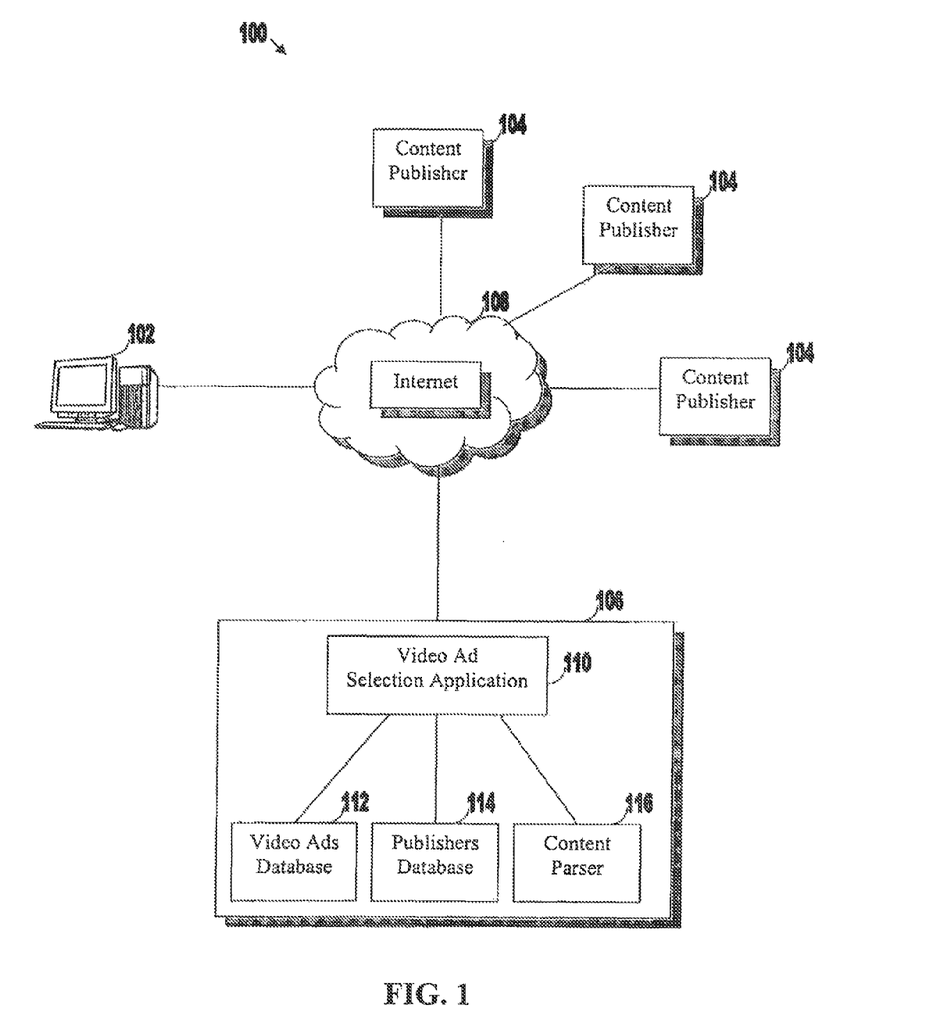
FIG. 1 is a block diagram of a system for selecting video advertisements for display over a communications network (e.g., internet) in accordance with an embodiment of the present invention.

Embodiments of the present invention relate to systems and methods for selecting and displaying an advertisement that includes video ("video advertisement" or "video ad"), or a sequence of video advertisements, substantially in real time in response to a request by an end-user for access to a web page. The advertisements may alternatively or additionally include text and/or graphic(s) (e.g., a logo for the advertiser), where the text and/or graphics may be related or unrelated to the video itself. FIG. 1 is a block diagram of a system 100 for selecting video advertisements for display over a network (e.g., the internet) in accordance with an embodiment of the present invention. System 100 includes user computer(s) 102, content publishers 104, and video advertisement ("ad") system 106 that communicate with one another over network 108 (e.g., internet). Each of user computer(s) 102, content publishers 104, and video ad system 106 may be in electrical communication with interne 108 via a suitable communications capability such as, for example, a cable or satellite connection, a local area network ("LAN"), any other suitable wired, wireless, or optical connection, or a combination thereof.

User computer 102 may include any suitable computing equipment for accessing content (e.g., web pages) over internet 108 and displaying video advertisements to end user(s) at user computer 102. For example, as shown in FIG. 1, user computer 102 may be a desktop computer. In other examples, user computer 102 may be a laptop computer, telephone (e.g., mobile phone), personal digital assistant ("PDA"), Black-Berry device, or any other suitable computing device. User computer 102 may have a web browser (e.g., Internet Explorer, Netscape Navigator, Mozilla Firefox) operating thereon for facilitating communications over internet 108. The web browser may access and read marked-up documents (e.g., HTML documents) from, for example, content publishers 104 and then translate and render those documents into web pages that can be viewed by end users at user computer 102. Typically, system 100 will include multiple user computers 102 although only one user computer 102 is shown in FIG. 1 to avoid overcomplicating the drawing.

Each content publisher 104 may be, for example, a publisher of web page(s) over internet 108. For example, one content publisher may be the computing system responsible for publishing the web pages viewable at http://www.espn.com. Another content publisher may be the computing system responsible for publishing the web pages viewable at http://www.foxnews.com. Each content publisher 104 may include one or more web servers for receiving and responding to requests from user computers 102 for access to the web page(s) provided by the content publisher. End users of user computers 102 may request access to a given web page by, for example, typing the Universal Resource Locator ("URL") for that web page into an address region of a web browser display or by selecting a link for the web page from a list of search results (e.g., Google search results).

Video ad system 106 may include video ad selection application 110, video ads database 112, publishers database 114, and content parser 116. Video ad selection application 110 may include any suitable hardware, software, or combination thereof for receiving and responding to requests for video advertisements received by video ad system 106 via internet 108. For example, video ad selection application 110 may include one or more web server(s). Responsive to the requests, video ad selection application 110 may select and transmit a video advertisement, or a sequence of video advertisements, for display within web pages provided by content publishers 104. Application 110 may select the video ads for display within the web pages based on any suitable criteria including, for example, relevance of the ads to the content of the web pages, bid price(s) of the associated advertisers, past performance of the video ads (or similar ads) upon placement within web pages by video ad system 106, or a combination thereof. In some embodiments, the requests for video advertisements may be initiated by web browsers operating on user computers 102, in a manner described in greater detail below. In some embodiments, the requests for video advertisements may be sent directly from the content publishers 104 to video ad system 106. As an alternative or in addition to the functions of video ad selection application 110 just described, application 110 may provide advertisers (not shown) with access to a bid/auction interface through which the advertisers can bid on or purchase ad placement opportunities and/or manage their respective accounts with video ad system 106.

Video ads database 112 may store video advertisement(s) for display within the web pages provided by content publishers 104 and accessed by user computers 102. The video ads stored in database 112 may be downloaded from advertiser(s) over internet 108 or received by video selection system 106 according to any other suitable approach (e.g., uploaded from portable storage media such as a digital video discs provided by the advertisers). Alternatively or additionally, video ads database 112 may store information associated with the video advertisements including, for example, topics/themes (e.g., for determining relevance of the ads to given web pages), associated text and/or graphic(s) (e.g., for simultaneous display with the video ad within a web page), close captioning information, information regarding the size, resolution, and or length (e.g., in seconds) of the video, information regarding past performance of the video advertisements (e.g., number of plays by video ad system 106 and/or click-throughs by end users of user computers 102), associated advertiser identifiers (e.g., for linking to billing information for the advertisers), bid and/or purchase amounts by the advertisers, and/or other criteria regarding the display of the video ads within web pages provided by content publishers 104 (e.g., an identification of one or more web pages in which a given video ad is eligible for display). As used herein, a theme or topic refers to the contextual gist of content (e.g., advertisement or web page). Illustrative examples of themes/topics are "San Francisco 49ers", "Airplane Accident", and "Bahamas Travel".

Publishers database 114 may store information regarding the content publishers 104 within system 100 including, for example, information identifying the web pages provided by content publishers 104 (e.g., a list of their respective URLs), information regarding the content (e.g., topics/themes) of those web pages, and/or information regarding the video advertisements displayed previously on those web pages and/or the revenue generated therefrom. Alternatively or additionally, publishers database 114 may store information regarding preferences of content publishers 104 such as, for example, information regarding the types of video advertisements eligible for display on the web pages provided by content publishers 104 and/or information regarding the placement of those advertisements within the web pages (e.g., location, format, and size). In the embodiment of FIG. 1, video ads database 112 and publishers database 114 are shown as separate databases, although it will be understood that alternative arrangements are possible. For example, a single database may be provided that stores the information just described as being stored in databases 112 and 114.

Content parser 116 may include any suitable hardware, software, or combination thereof for parsing web pages provided by content publishers 104 and identifying topic(s)/theme(s) or other indicia associated therewith. Content parser 116 may read publisher's content and relate it through semantic vectors to one or more topic(s)/theme(s) with an associated relevancy score. For example, a page of content provided by Publisher A may be determined to be about "Travel" with a relevancy of 1.0 (100%), "Vacations" with a relevancy of 0.86 (86%), "Cruises" with a relevancy of 0.72 (72%), and "Live Entertainment" with a relevancy of 0.51 (51%). The topics/themes and associated relevancies output of content parser 116 may provide specific ad placement opportunities for which individual ads (listings) can bid. The parsed information may be used by video ad application 110 to select video ad(s) for placement within the web pages such as, for example, the video ad(s) stored in database 112 that are most or very relevant to the identified topic(s)/theme(s).

Content parser 116 may be configured to return a maximum number (e.g., 10 or more) of themes/topics associated with each page. Alternatively, there may be a different or no limit to the number of themes/topics that can be identified by content parser 116. Content parser 116 may return a ranked list of themes/topics that identifies the themes/topics in order of greatest to least relevant to the contents of the web page (e.g., such that ads associated with the most relevant theme/topic are more likely to be displayed earlier in a sequence of ads selected by system 106 for display). Those skilled in the art will recognize that other orders are equally useful and may be employed. In some embodiments, content parser 116 may operate substantially in real-time, whereby web pages are parsed at substantially the same time they are accessed by user computers 102. In other embodiments, content parser 116 may parse the web pages periodically, continuously, or according to any other suitable approach (e.g., automatically upon receipt of an electronic notification from a content publisher 104 that the content of the web page(s) has changed or under the control of an operator associated with video ad system 106). In some embodiments, content parser 116 may be activated selectively by video ad system 106, based on a determination of the best yield between "hard match" (i.e., selecting ads specifically intended for placement within given web pages or sections thereof) and/or semantic matching facilitated by content parser 116. Factors considered within this determination may include factors indicative of past performance including the time of day, day of week, and/or the performance of particular advertisement(s) and/or associated theme/topic on the given web page (or similar pages). In some embodiments, when video ad system 106 determines suitable video ad(s) to display on a given page provided by a content publisher 106, system 106 may take into account relevancy, effective bid (e.g., the actual price paid for a click given market dynamics), max bid price (willingness to pay), past performance, other criteria, or combinations thereof as they relate to that specific page.

Video ad system 106 may establish relationships with one or more content publishers 104 in order to allow system 106 to place ads within the web pages provided by the publishers upon access of the pages by user computers 102. In some embodiments, video ad system 106 may limit the content publishers 104 that are permitted to associate with system 106 to "premium" publishers such as, for example, providers of web pages that typically receive a minimum number of visits per period (e.g., day, portion of day, month, year). One or more threshold criteria may be established that govern whether a given content publisher is permitted to associated with video ad system 106. Advantageously, this may increase the willingness of advertisers to place their ads through video ad system 106 and increase the revenue that can be derived per ad placement and/or subsequent action (e.g., click-through) by an end user of user computer 102.

Establishing a relationship with a content publisher 104 may include negotiating a revenue-sharing arrangement between the video ad system 106 and content publisher 104 for revenue generated as a result of displaying video ads within the web pages and/or subsequent actions of end-users of user computers 102. Alternatively or additionally, establishing a relationship with a content publisher 104 may include managing interoperability between system 106 and the content publisher to, for example, minimize the latency perceived by end-users of user computers 102. Managing system interoperability may include establishing a protocol for communications upon access of the web pages by end users of user computers 102 (e.g., communications between content publisher 104/user computer 102, user computer 102/video ad system 106, and/or content publisher 104/video ad system 106).

Figure 2:
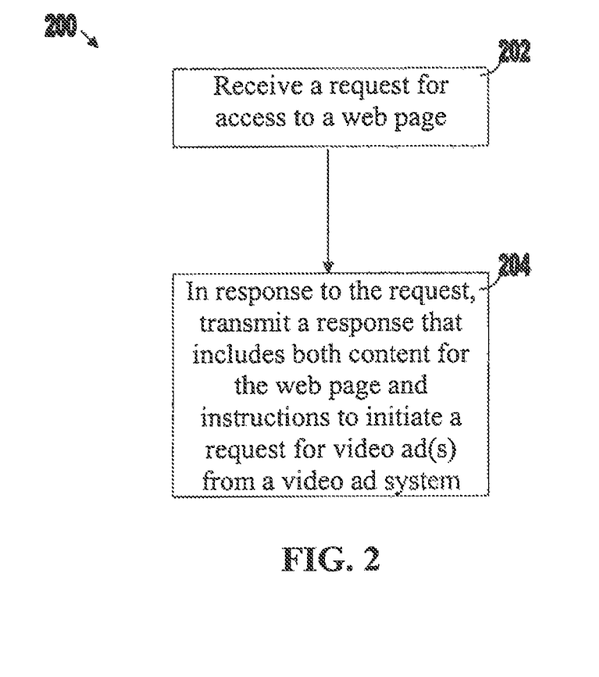
FIGS. 2-3 are flowcharts of illustrative stages involved in the selection and display of video advertisements within pages (e.g., web pages) over a communications network in accordance with embodiments of the present invention.
Figure 3:
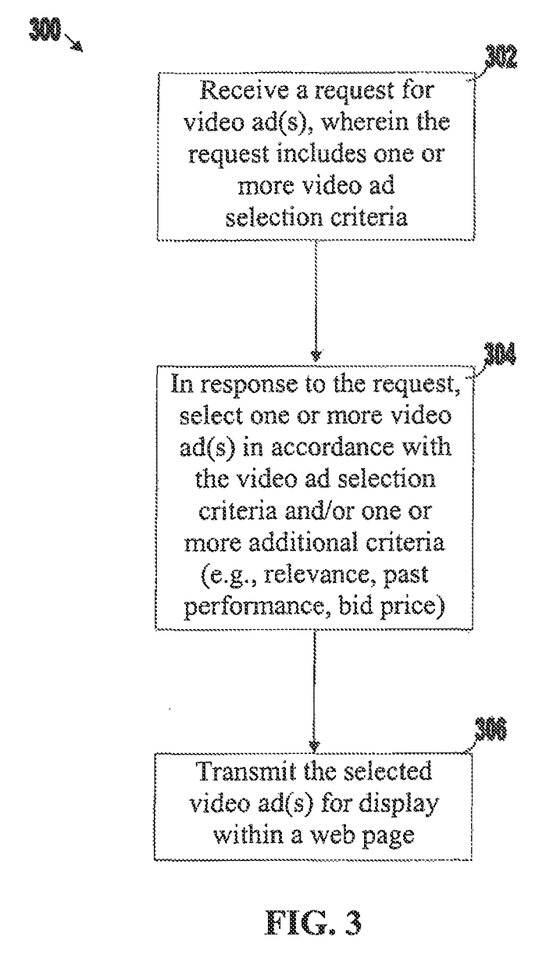

FIGS. 2 and 3 are flowcharts (200, 300) of illustrative stages involved in selection and display of video ads within web pages in accordance with various embodiments of the present invention. More specifically, FIGS. 2 and 3 show an embodiment of a communications protocol between a user computer 102 and content provider 104 (FIG. 2), and subsequently between user computer 102 and video ad system 106 (FIG. 3), that may be adhered to upon a request by user computer 102 for access to a web page provided by content publisher 104. Referring to FIG. 2, at stage 202 a request for access to a web page may be received. For example, a web server associated with content publisher 104 may receive an HTTP (Hypertext Transfer Protocol) request for access to a web page provided by the publisher from a web browser operating on user computer 102. At stage 204, content publisher 104 may transmit a response (e.g., HTTP response) to the requesting user computer 102, where the response includes both content for the requested web page as well as instructions to initiate a request for video ad(s) from video ad system 106. The content and/or instructions may be received by user computer 102 in the form of markup code, which may be translated and processed by the web browser operating on user computer 102. Preferably, the markup code is structured such that user computer 102 sends the request for video ads to system 106 at substantially the same as or even before user computer 102 translates the markup code necessary for rendering the web page display. If the web page is at least partially displayed before the video ad(s) are received from video ad system 106 (e.g., when video ads database 112 does not include any advertisements suitable for display within the web page), the markup code may provide a message or other content (e.g., advertisement) for display within the region of the web page otherwise reserved for the video ad.

Referring to FIG. 3, at stage 302 a request for video ad(s) may be received, wherein the request may include one or more video ad selection criteria (e.g., location, size, and/or format of the video ad within a web page). For example, video ad system 106 may receive a request for video ad(s) from User computer 102, which request is formatted in accordance with the instructions received by user computer 102 from content publisher 104 at stage 204 (FIG. 2). Other examples of video ad selection criteria that may be included in the request received by video ad system 106 at stage 302 may be the identity of the content publisher, specific web page accessed (e.g., identified by URL), and/or end-user demographic data and/or preferences (e.g., provided by content provider 104 in the instructions sent to user computer 102 through the use of cookies by content provider 104, or maintained locally by user computer 102). At stage 304, a video ad, or a sequence of video ads, may be selected in accordance with the video ad selection criteria and/or one or more additional criteria such as relevance, bid price, past performance, or a combination thereof. At stage 306, the selected video ad(s) may be transmitted for display within a web page. The video ads displayed within the web page may be at least partly interactive. For example, in response to an end user selecting a video ad (e.g., clicking over the ad region with a mouse while the video is being displayed), the web browser operating on user computer 102 may be redirected to a website of the advertiser.

In some embodiments, video ad system 106 may provide user computer 102 with one or more thumbnails (graphics) in response to receiving a request for video advertisement(s) from user computer 102, where each thumbnail comprises a single frame (e.g., the first frame, the last frame, or any other frame) of a corresponding video advertisement stored in database 112. After the thumbnail(s) are displayed by user computer 102, a selection of the thumbnail(s) by an end-user (e.g., a click directly on the thumbnail or on an associated option) may cause user computer 102 to submit a request to video ad system 106 for the full video advertisement and/or may redirect the web browser of user computer 102 to the advertiser's website (e.g., embedded code in the thumbnail may cause the thumbnail to function as a hyperlink). Over time, video ad system 106 may rotate (e.g., randomly or according to an established pattern) the frame of a given video advertisement that system 106 selects and transmits to user computer 102 as being representative of the video advertisement. Video ad system 106 may track which frame(s) generate the largest number of "plays" of the video advertisement and/or "click-throughs" to the advertiser's site (e.g., the highest yielding thumbnail(s)). When video ad system 106 determines that a given video advertisement is relevant to a request for video advertisements from user computer 102, based at least in part on the tracked information the video ad system 106 may select and return particular frame(s) as being representative of the video advertisement. Alternatively or additionally, the tracked information may be used by video ad system 106 to determine whether the video advertisement is relevant to the request from user computer 102 in the first instance.

The following description provides additional details regarding the selection of video advertisements by video ad selection application 110, as well as the placement and modification of bids by advertisers through video ad system 106. Each advertisement stored in video ads database 112 may have a bid amount associated therewith, which bid amount may be modifiable by the associated advertiser. For example, the advertiser may access a bid/auction interface provided by video ad selection application 110 in order to place and/or modify (e.g., increase or decrease) a bid amount. The bid amount (e.g., a monetary value or number of credits) may correspond to the maximum amount the advertiser is willing to pay for the ad to be selected by system 106 for display under a given set of conditions. Alternatively, or additionally, the bid amount may reflect the maximum amount the advertiser is willing to pay each time the advertisement is selected (e.g., clicked) by an end-user after video ad system 106 causes the advertisement to be displayed within a web page under that set of conditions.

In some embodiments, an advertisement may have multiple bids associated therewith, such that the bid amount varies according to the specific ad placement opportunity (e.g., theme, web page, and/or location). A theme/topic, web page, content publisher, or combination thereof may represent a unique ad placement opportunity. As such, an auction may be established for each ad placement opportunity, such that each auction may have its own price and its own market. To illustrate, one auction may correspond to the placement of ads on any ESPN™ web page regardless of the content of that page. Another auction may correspond to the placement of ad(s) on ESPN™ web pages related to the Chicago Cubs™ (e.g., where the content of the particular web page may be determined by content parser 116). In this scenario, the latter auction may receive higher bid price(s) if advertisers find the theme/topic "Chicago Cubs" to be particularly desirable.

The market for a particular auction may be characterized by multiple bids from multiple advertisers, where each advertiser indicates the maximum bid amount it is willing to pay. The actual cost that is deducted from an advertiser's account in response to selection of its advertisement by system 106 (for display within a web page) and/or by an end user of user computer 102 may be determined by supporting bids in something akin to a second price auction. For example, if advertisers A, B and C submit respective bids of $5.00, $3.00 and $1.00 and a minimum acceptable bid price of $0.25 for the theme/topic "Chicago Cubs" on any ESPN™ web page, then advertiser A will be charged $3.01, advertiser B will be charged $1.01 and advertiser C will be charged $0.25. The foregoing example assumes there are no other auctions competing for the same ad placement opportunity, such as an auction for the placement of an ad within the specific ESPN™ web page (e.g., related to baseball) in which the ad placement opportunity is currently presented.

To select video ad(s) for placement within pages, video ad selection application 110 may evaluate at least one of relevancy (determined by semantic analysis of a page of content including metadata, actual content, supporting graphics and names, etc.), maximum willingness to pay, past performance of a listing (e.g., by time of day, day of week, and week of year of that listing on that page), other criteria, and actual price paid based on supporting market data such as the use of a second-price auction approach. Each value may be given a weight which can cause it to be excluded from calculation or weighted superordinarily compared to its peers on an individual page basis. Each value can also be used as a pre-filter prior to evaluation. For example, the system can exclude all candidate listings having bidded topics less than 86% relevant to a page. Alternatively or additionally, the system can exclude any listing having an actual price paid less than $0.50, having a max willingness to pay less than $1.00, and/or having a past performance less than 0.01% for that time of day. Of course, it will be understood that the actual numbers/thresholds will be a design choice configurable and selectable by one of ordinary skill in the art.

When video ad selection application 110 selects a sequence of ads for display within a web page, the sequence may be ordered, for example, randomly or based on data associated with past performance, bid prices, relevance to identified topics/themes or a combination thereof. Again, when video ad system 106 determines suitable video ad(s) to display on a given page provided by a content publisher 106, system 106 may take into account relevancy, effective bid (e.g., the actual price paid for a click given market dynamics), max bid price (willingness to pay), past performance, other criteria, or combinations thereof as they relate to that specific page. Alternatively, or additionally, the selection can be based on characteristics for individual listings (ads). For example, an individual URL for a publisher page may consist of a single news article generated on that very day. That page can be set up to calculate yield based on the relevance of listings to that topic multiplied by the customers' willingness to pay (max bid price). On another page, for a related news article, the yield score may just be calculated on the effective cost of the ad multiplied by its past performance on that page, its effective cost per click, the max willingness to pay, and its relevancy. Each page in a site may be configurable in the calculation of the yield product and each component of the yield product has an associated value with it that allows that component to be "weighted" for each page. The publisher as a whole (e.g., an entire website) may have values that are inherited or considered to be the default for the entire website until such time as those values are overridden on a per page or per section basis.

In an embodiment, application 110 may order the advertisements within the sequence of ads according to max bid amount only, which is indicative of the maximum amounts the advertisers are willing to pay.

In another embodiment, video ad system 106 may order the ads within the sequence based on the actual amount the advertisers would pay according to market conditions only (i.e., based on all the bids for the ad placement opportunity). For example, when there exist two overlapping auctions for the same ad placement opportunity, ordering the ads by the actual amount that would be paid may produce a different result than ordering the auctions by max bid amount.

In still another embodiment, video ad system 106 may order the ads within the sequence based on a product of past performance (e.g., by time of day) and amount paid (e.g., by time of day, when the bid is such that different amounts apply throughout the day), and using a configurable proxy representative of the average of similar listings performance when past performance is not available (e.g., such as when a new advertisement is included in database 112). Only the highest performing ads may be included in the ad sequence. In this embodiment, where past performance is not available, a value may be calculated for past performance based on similar listings' performance for the time of day. The listing itself and the website to which that listing directs users upon a click may be semantically analyzed to determine their "topic". For example, a travel advertiser may be assigned a topic of "Travel" or potentially more specifically "Airline Travel" if that advertiser is an airline. The performance of similar listings on that topic on that page may be calculated for that time of day to give the listing a probability of performance as its initial past performance value.

In another embodiment, the ads may be ordered in the sequence of ads with a learning percentage to continuously evaluate other ads (learning percentage is configurable). For example, if the learning percentage is 10%, then 90% of ads delivered may conform to the previous embodiment (or some other criteria for ordering the ads) and the remaining 10% of the ads in the sequence may be selected randomly to build listing performance data relevant to a theme/topic and/or content publisher 104. Still other approaches may be provided in which aspects of the foregoing embodiments are combined (e.g., 10% of ads based on max bid, 20% based on price paid, and so on).

In another embodiment, video ad selection application 110 may factor "relevancy" scores into the ad selection process (e.g., using not only past performance but additionally multiplying the "relevancy" score determined during semantic analysis by content parser 116 whereby, for example, webpage content may be resolved to be 0.86 relevant to theme/topic Chicago Cubs™ and 0.72 relevant to theme/topic American League Pitchers).

Thus it is seen that systems and methods are provided for selecting and displaying video advertisements over the internet. Although particular embodiments have been disclosed herein in detail, this has been done by way of example for purposes of illustration only, and is not intended to be limiting with respect to the scope of the appended claims, which follow. In particular, it is contemplated by the inventors that various substitutions, alterations, and modifications may be made without departing from the spirit and scope of the invention as defined by the claims. Other aspects, advantages, and modifications are considered to be within the scope of the following claims. The claims presented are representative of the inventions disclosed herein. Other, unclaimed inventions are also contemplated. The inventors reserve the right to pursue such inventions in later claims.

Insofar as embodiments of the invention described above are implementable, at least in part, using a computer system, it will be appreciated that a computer program for implementing at least part of the described methods and/or the described systems is envisaged as an aspect of the present invention. The computer system may be any suitable apparatus, system or device, electronic, optical, or a combination thereof. For example, the computer system may be a programmable data processing apparatus, a general purpose computer, a Digital Signal Processor, an optical computer or a microprocessor. The computer program may be embodied as source code and undergo compilation for implementation on a computer, or may be embodied as object code, for example.

It is also conceivable that some or all of the functionality ascribed to the computer program or computer system aforementioned may be implemented in hardware, for example by means of one or more application specific integrated circuits and/or optical elements. Suitably, the computer program can be stored on a carrier medium in computer usable form, which is also envisaged as an aspect of the present invention. For example, the carrier medium may be solid-state memory, optical or magneto-optical memory such as a readable and/or writable disk for example a compact disk (CD) or a digital versatile disk (DVD), or magnetic memory such as disk or tape, and the computer system can utilize the program to configure it for operation. The computer program may also be supplied from a remote source embodied in a carrier medium such as an electronic signal, including a radio frequency carrier wave or an optical carrier wave.

What is claimed is:

1. A computer-implemented method, comprising:
receiving a request for an advertisement from a client device, the request being associated with a corresponding web page;
in response to the received request, obtaining, using at least one processor, information identifying a candidate video advertisement comprising a plurality of frames, the obtained information identifying one or more of the frames that are representative of the candidate video advertisement;
identifying, using the at least one processor, at least one of the representative frames for presentation to a user of the client device, the identification being based on information identifying a past performance of the candidate video advertisement on the web page; and
generating an instruction to transmit the at least one identified representative frame to the client device.

2. The method of claim 1, further comprising computing a metric indicative of a relevance of the candidate video advertisement to the user of the client device.

3. The method of claim 2, further comprising:
determining whether the computed metric exceeds a threshold value; and
generating the instruction to transmit the at least one identified representative frame to the client device when the computed metric exceeds the threshold value.

4. The method of claim 2, wherein:
the received request comprises demographic data associated with the user; and
the computing comprises determining the relevance of the candidate video advertisement to the user based on the demographic data.

5. The method of claim 2, further comprising:
computing a metric indicative of a relevance of the candidate video advertisement to the web page based on a semantic analysis of at least one of metadata or content associated with the web page;
determining whether the computed metric exceeds a threshold value; and
generating the instruction to transmit the at least one identified representative frame to the client device when the computed metric exceeds the threshold value.

6. The method of claim 1, wherein:
the received request comprises information identifying a time period associated with the request; and
the identifying comprises identifying the candidate video advertisement based on bid information, the bid information identifying at least one of an actual price paid by an advertiser for the candidate video advertisement during the time period, or a maximum of prices paid by a plurality of advertisers for the candidate video advertisement during the time period.

7. The method of claim 1, further comprising:
identifying at least one proxy video advertisement having contextual similarity with the candidate video advertisement;
monitoring a performance of the proxy video advertisement on the web page during at least one time period; and
generating the information identify the past performance of the candidate video advertisement based on at least a portion of the monitored performance of the proxy video advertisement.

8. The method of claim 1, wherein the identifying comprises:
obtaining data indicative of a performance of the one or more representative frames during a corresponding time period;
selecting the at least one identified representative frame from the one or more representative frames based on the obtained performance data.

9. The method of claim 1, further comprising:
receiving a selection of the transmitted at least one identified representative frame by the user of the client device; and
generating an additional instruction to transmit the candidate video advertisement to the client device, in response to the received selection.

10. The method of claim 1, wherein:
the received request comprises selection criteria that includes at least one of a location of an advertising region within the web page, a size of the advertising region, a format of the advertising region, a publisher of the web page, or the user preference for the advertisement; and
the identifying comprising identifying the candidate video advertisement for the advertising region of the web page based on the selection criteria.

11. An apparatus, comprising:
a storage device that stores a set of instructions; and
at least one processor coupled to the storage device, the at least one processor being operative with the set of instructions in order to:
receive a request for an advertisement from a client device, the request being associated with a corresponding web page;
in response to the received request, obtain information identifying a candidate video advertisement comprising a plurality of frames, the obtained information identifying one or more of the frames that are representative of the candidate video advertisement;
identify at least one of the representative frames for presentation to a user of the client device, the identification being based on information identifying a past performance of the candidate video advertisement on the web page; and
generate an instruction to transmit the at least one identified representative frame of the candidate video advertisement to the client device.

12. The apparatus of claim 11, wherein the at least one processor is further operative with the set of instructions to:
compute a metric indicative of a relevance of the candidate video advertisement to the user of the client device;
determine whether the computed metric exceeds a threshold value; and
generate the instruction to transmit the at least one identified representative frame to the client device when the computed metric exceeds the threshold value.

13. The apparatus of claim 12, wherein:
the received request comprises demographic data associated with the user; and the at least one processor is further operative with the set of instructions to determine the relevance of the candidate video advertisement to the user based on the demographic data.

14. The apparatus of claim 11, wherein the at least one processor is further operative with the set of instructions to:
  compute a metric indicative of a relevance of the candidate video advertisement to the web page based on a semantic analysis of at least one of metadata or content associated with the web page;
  determine whether the computed metric exceeds a threshold value; and
  generate the instruction to transmit the at least one identified representative frame to the client device when the computed metric exceeds the threshold value.

15. The apparatus of claim 11, wherein:
  the received request comprises information identifying a time period associated with the request; and
  the at least one processor is further operative with the set of instructions to identify the candidate video advertisement based on bid information, the bid information identifying at least one of an actual price paid by an advertiser for the candidate video advertisement during the time period, or a maximum of prices paid by a plurality of advertisers for the candidate video advertisement during the time period.

16. The apparatus of claim 11, wherein the at east one processor is further operative with the set of instructions to:
  identify at least one proxy video advertisement having contextual similarity with the candidate video advertisement;
  monitor a performance of the proxy video advertisement on the web page during at least one time period; and
  generate the information identifying the past performance of the candidate video advertisement based on at least a portion of the monitored performance of the proxy video advertisement.

17. The apparatus of claim 11, wherein the at least one processor is further operative with the set of instructions to:
  obtain data indicative of a performance of the one or more representative frames during a corresponding time period;
  select the at least one identified representative frame from the one or more representative frames based on the obtained performance data.

18. The apparatus of claim 11, wherein the at least one processor is further operative with the set of instructions to:
  receive a selection of the transmitted at least one identified representative frame by the user of the client device; and
  generate an additional instruction to transmit the candidate video advertisement to the client device, in response to the selection.

19. The apparatus of claim 11, wherein:
  the received request comprises selection criteria that includes at least one of a location of an advertising region within the web page, a size of the advertising region, a format of the advertising region, a publisher of the web page, or the user preference for the advertisement; and
  the at least one processor is further operative with the set of instructions to identify the candidate video advertisement based on the selection criteria.

20. A tangible, non-transitory computer-readable medium that stores a set of instructions that, when executed by at least one processor, cause the at least one processor to perform a method comprising:
  receiving a request for an advertisement from a client device, the request being associated with a corresponding web page;
  in response to the received request, obtaining, information identifying a candidate video advertisement comprising a plurality of frames, the obtained information identifying one or more of the frames that are representative of the candidate video advertisement;
  identifying at least one of the representative frames for presentation to a user of the client device, and the identification being based on information identifying a past performance of the candidate video advertisement on the web page; and
  generating an instruction to transmit the at least one identified representative frame of the candidate video advertisement to the client device.

21. The method of claim 1, wherein:
  the method further comprises obtaining information identifying one or more metrics indicative of the past performance of the candidate video advertisement on the web page, the past performance metrics being associated with corresponding ones of the representative frames; and
  the identifying comprises identifying the at least one representative frame for presentation to the user of the client device based on the past performance metrics.

22. The method of claim 1, wherein the identifying further comprises selecting the at least one representative frame from the plurality of representative frames randomly or in accordance with a predetermined sequence.

23. The method of claim 1, wherein:
  the identifying further comprises identifying a single one of the representative frames for presentation to the user of the client device, based on the information identifying a past performance of the candidate video advertisement on the web page; and
  generating an instruction to transmit the single representative frame to the client device.

* * * * *

UNITED STATES PATENT AND TRADEMARK OFFICE
CERTIFICATE OF CORRECTION

| | | |
|---|---|---|
| PATENT NO. | : 8,874,698 B2 | Page 1 of 1 |
| APPLICATION NO. | : 13/846573 | |
| DATED | : October 28, 2014 | |
| INVENTOR(S) | : Martin Abbott et al. | |

It is certified that error appears in the above-identified patent and that said Letters Patent is hereby corrected as shown below:

In the Claims

Claim 16, Col. 13, Line 28, "at east" should read as --at least--.

Signed and Sealed this
Tenth Day of March, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,874,698 B2 | Page 1 of 1 |
| APPLICATION NO. | : 13/846573 | |
| DATED | : October 28, 2014 | |
| INVENTOR(S) | : Martin Abbott et al. | |

It is certified that error appears in the above-identified patent and that said Letters Patent is hereby corrected as shown below:

On the Title Page, add Item (63), Related Application Data as follows:

--Continuation of application No. 11/646,637, filed on December 28, 2006, now Pat. No. 8,402,114.--

Signed and Sealed this
Seventh Day of July, 2015

Michelle K. Lee
*Director of the United States Patent and Trademark Office*